United States Patent
Lee et al.

(10) Patent No.: US 8,670,903 B2
(45) Date of Patent: Mar. 11, 2014

(54) LANE CENTERING FAIL-SAFE CONTROL USING DIFFERENTIAL BRAKING

(75) Inventors: Jin-Woo Lee, Rochester Hills, MI (US); Nikolai K. Moshchuk, Grosse Pointe, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 13/101,397

(22) Filed: May 5, 2011

(65) Prior Publication Data

US 2012/0283907 A1     Nov. 8, 2012

(51) Int. Cl.
*G06F 19/00* (2011.01)
*B62D 5/04* (2006.01)

(52) U.S. Cl.
USPC ............ 701/41; 701/42; 701/28; 180/446; 180/167; 180/168

(58) Field of Classification Search
USPC ........ 701/41, 42, 28, 57, 58, 59, 60; 180/446, 180/167, 168, 400; 702/151, 127, 109
See application file for complete search history.

(56) References Cited

U.S. PATENT DOCUMENTS

| | | | |
|---|---|---|---|
| 5,913,375 A * | 6/1999 | Nishikawa | 180/168 |
| 7,680,569 B2 * | 3/2010 | Matsumoto et al. | 701/28 |
| 7,711,464 B2 * | 5/2010 | Kaufmann | 701/41 |
| 7,898,400 B2 * | 3/2011 | Hadi et al. | 340/435 |
| 8,170,788 B2 * | 5/2012 | Sjogren et al. | 701/301 |
| 8,423,246 B2 * | 4/2013 | Takeda et al. | 701/41 |
| 2004/0039507 A1 * | 2/2004 | Yao et al. | 701/41 |
| 2006/0235591 A1 * | 10/2006 | Tamaizumi | 701/41 |
| 2008/0091318 A1 | 4/2008 | Deng et al. | |
| 2009/0319113 A1 | 12/2009 | Lee | |
| 2010/0131233 A1 | 5/2010 | Deng et al. | |
| 2010/0228420 A1 | 9/2010 | Lee | |

OTHER PUBLICATIONS

Pilutti, Tom et al., "Vehicle Steering Intervention Through Differential Braking," Transactions of the ASME, vol. 120, Sep. 1998, pp. 314-321.
Kyongsu, Yi et al., "An investigation into differential braking strategies for vehicle stability control," Proceedings of the Institution of Mechanical Engineers, Part D: Journal of Automobile Engineering, 2003, pp. 1081-1093.
U.S. Appl. No. 13/101,271, filed May 5, 2011, Lee et al.
U.S. Appl. No. 13/101,346, filed May 5, 2011, Lee et al.
U.S. Appl. No. 13/101,308, filed May 5, 2011, Lee et al.

* cited by examiner

*Primary Examiner* — Ronnie Mancho
(74) *Attorney, Agent, or Firm* — Mark S. Cohen; Pearl Cohen Zedek Latzer Baratz LLP (57) ABSTRACT

Method, system and non-transitory computer-readable medium for fail-safe performance of a lane centering system. An electrical power steering (EPS) system of a vehicle is monitored for a failure and operation of the lane centering system is switched to a differential braking controller to output differential braking commands to a differential breaking system upon determining that a failure of the EPS system has occurred, where the output braking commands direct the differential braking system to apply force a brake for a wheel of vehicle, such by the applied braking force the vehicle follows a desired path determined for a lane centering operation.

20 Claims, 7 Drawing Sheets

LANE CENTERING FAIL-SAFE CONTROL USING DIFFERENTIAL BRAKING

TECHNICAL FIELD

The present disclosure relates generally to the field of autonomous and semi-autonomous driving control systems, and, more particularly, to the fields of lane centering control systems and fail-safe controls for lane centering control systems.

BACKGROUND OF THE INVENTION

Increasingly, vehicles are being equipped with autonomous and/or semi-autonomous driving mechanisms providing automated diving controls where less driver intervention is required. Though only a few vehicles today may have been created to be fully autonomous (i.e. capable of driving from point A to point B without any driver intervention), many commercially-available vehicles today may employ autonomous and semi-autonomous features.

Cruise control systems, for example, have long been available where a driver sets the speed of the vehicle and the vehicle automatically controls the throttle. Adaptive cruise control systems have been developed too, where the system maintains a set speed and also automatically slows the vehicle if the system senses the vehicle is approaching a slower-moving vehicle. Commercially available autonomous parking systems may automatically provide steering controls to park a vehicle. Further, semi-autonomous, or "driver-assist" features, such as steering-torque assist or steering angle assist, automatically intervene if the driver makes a harsh steering maneuver that could affect vehicle stability.

In autonomous and semi-autonomous control systems, an automated lane centering (LC) system may provide automatic steering control for a vehicle, for example to center a vehicle in a lane as the vehicle moves on a curving road. An LC control system may allow a driver to be distracted, or even to not hold the steering wheel, while an LC system is engaged. An LC system may be incorporated into or used in connection with an electrical power steering (EPS) system in a vehicle. In such a configuration, the LC system may use electronic steering controls to turn the vehicle wheels (e.g. using a motor to move the steering column of the vehicle and thereby turning the vehicle wheels). By its use of the EPS system, an LC system may maintain the position of vehicle, for example, in the center of the lane in question. A LC system may also be used in applications such as lane changing.

U.S. patent application Ser. No. 12/143,439 entitled "PATH GENERATION ALGORITHM FOR AUTOMATED LANE CENTERING AND LANE CHANGING CONTROL SYSTEM," and U.S. patent application Ser. No. 12/399,317 entitled "MODEL BASED PREDICTIVE CONTROL FOR AUTOMATED LANE CENTERING/CHANGING CONTROL SYSTEMS," both assigned to the assignee of this application and both herein incorporated by reference, disclose systems and methods for providing path generation for lane centering and lane changing in an autonomous or semi-autonomous vehicle.

Where the LC system uses an electrical power steering (EPS) system for its automatic steering control, it is possible that the EPS system could fail (for example, by communication system failure, control processor crash, mechanical problem in the steering system, etc.). In such a situation, an LC system could not, upon the failure, provide automatic steering control, because the system's ability to control the vehicle's steering would be cut-off. In some circumstances, a failure of an EPS system may cause the front wheels of the system to lock in their current steering angle position, causing further risk of vehicle accident.

Thus, a challenge to safety is presented in an LC system in the event of a failure such as an EPS system failure.

SUMMARY OF THE INVENTION

An embodiment of the present invention may provide a fail-safe system for a lane centering (LC) control, which may be used, for example in a vehicle such as an automobile. In such an exemplary embodiment, a differential braking system and method may be applied as the fail-safe for the (LC) control system.

In one example of an embodiment of the present invention, a redundant mechanism applying differential braking may be triggered, when the electrical power steering (EPS) system of a vehicle fails. In such an example, differential braking control for the LC system may be activated only when the EPS system has failed to operate.

A method for fail-safe lane centering, may include monitoring an EPS system of a vehicle for a failure, and, upon determining a failure of the EPS system has occurred, switching the control flow for the lane centering system from a steering controller of the lane centering system to a differential braking controller, where the differential braking controller may output differential braking commands to a differential breaking system, e.g. to apply braking forces for the wheels of vehicle,—so the vehicle follows a desired path determined for lane centering.

A system for fail-safe performance of a lane centering system may include a differential braking controller coupled to a differential braking system, and a supervisory element coupled to the differential braking controller, the supervisory element configured to monitor an EPS system of a vehicle for a failure and, upon determining that a failure has occurred, switch an output of the lane centering system to an output of the differential braking controller, where the output of the differential braking controller provides a braking command to the differential braking system for an application of a braking force to a wheel of the vehicle, and where by the application of the braking force the vehicle follows a desired path determined for a lane centering operation.

A non-transitory computer-readable medium may have instructions stored on the medium, which when executed by a processor, may cause the processor to perform methods described herein.

A method, system and non-transitory computer-readable medium according to an embodiment of the invention, may determine a yaw moment needed by the LC control system. Yaw moment ($\Delta\tau$) for a vehicle represents an amount of force against the vehicle's center of gravity which may be applied to a vehicle to turn or pivot the vehicle and change its heading orientation. Based on that determined yaw moment, the method may calculate a sequence of differential braking forces to be applied to the wheels of the vehicle. The system and method may maintain the vehicle motion according to the sequence of differential braking forces for a period, for example, the next delta ($\Delta$) t seconds (e.g. the next 3 seconds, tunable), allowing the driver to get back to the steering control within the period.

In a method, system and non-transitory computer-readable medium according to an embodiment of the present invention, a lane centering system may generate and the fail-safe system may use elements that may determine a desired path and a predicted path for a moving vehicle. For example, a lane mark detection system of a lane centering system may recognize lane marks in a road, dividing the road into lanes. A desired path generation module of a lane centering system may generate a smooth desired path for a lane centering according to vehicle dynamics (such as vehicle mass, inertia, dimensions, etc.) and the lane marks detected (such as generating a smooth path from the current vehicle position to the center of the lane as an example). A predicted path prediction system of a lane centering system may further generate the vehicle's predicted future path based on current vehicle dynamics such as vehicle speed, yaw rate, and the steering angle (the amount the front wheels of the car are turned from being parallel with the sides of the car).

In a lane centering system, a lane centering steering controller may control the steering angle of the car via commands to a electrical power steering (EPS) system to move a vehicle to a determined lane center (and, for example, center the vehicle in the lane as it moves). However, in the event that the EPS system fails, the LC system may suddenly have no ability to change the steering angle.

An embodiment of the invention may provide, however, that in the event that a steering system failure is detected, a supervisory function may switch to a fail-safe braking controller, which, for example, may use differential braking to control the vehicle and, for example maintain the vehicle in the lane.

In applying a differential braking control to maintain lane control, the fail-safe system may use the desired path and predicted path information available (e.g. from elements of the lane controller system or generated from fail-safe system sources) to find a sequence of braking commands for the available wheels of the vehicle. For example, the fail-safe system may find a braking command sequence such as, $F_{left\ front\ wheel}(t)$, $F_{right\ front\ wheel}(t)$, $F_{left\ rear\ wheel}(t)$, $F_{right\ rear\ wheel}(t)$, on a time interval (such as $[0, \Delta t]$) that minimizes the difference of the desired path and the predicted path of the vehicle.

A fail-safe differential braking controller according to an embodiment of the invention may, for example, generate braking commands for each wheel to minimize orientation and offset errors (e.g. differences in vehicle heading and lateral offset position) between the vehicle's desired path and the vehicle's predicted path.

To minimize such orientation and offset errors between the vehicle's desired path and predicted path, the fail-safe differential braking controller according to an embodiment of the invention may use a cost function, where the orientation and offset errors between the vehicle's desired path and predicted path are minimized according to a yaw moment value for the vehicle.

As stated, yaw moment ($\Delta\tau$) for a vehicle represents an amount of force against the center of gravity of the vehicle which may be applied to a vehicle to turn or pivot the vehicle and change its yaw or heading. Where a yaw moment ($\Delta\tau$) may be determined according to a cost function that minimizes the difference between vehicle's desired path and predicted path, the yaw moment ($\Delta\tau$) force, when applied, may move or keep the vehicle on a path that minimizes the difference between the vehicle's desired and predicted path. Thus, by generating forces to create the determined yaw moment ($\Delta\tau$), the vehicle will move to or stay on the desired path.

An embodiment of the present invention may provide that differential braking forces that may be applied by the fail-safe differential braking mechanism to exert force indicated by the yaw moment ($\Delta\tau$).

Once the yaw moment ($\Delta\tau$) is determined, the fail-safe differential braking controller according to an embodiment of the present invention may calculate, using the yaw moment ($\Delta\tau$), a total of front and rear brake forces ($F_{Total}$) to be applied in differential braking. That total front and rear brake force may be calculated for the wheels of either the right-hand side of the vehicle ($F_{Total\ RHS}$) or the left-hand side of vehicle ($F_{Total\ LHS}$).

Here, it is noted that the yaw moment ($\Delta\tau$) may direct the vehicle to be turned in either a clockwise (CW) or counterclockwise (CCW) direction or the yaw moment ($\Delta\tau$) may determine that the vehicle may not be turned at all.

For example, a yaw moment ($\Delta\tau$) that is negative may indicate that the vehicle should be turned in a clockwise direction to maintain or move toward desired lane centering. To turn the vehicle in a clockwise (CW) direction, the fail-safe system may only apply differential braking force to the wheels on the right-hand side of the vehicle, and in such an instance very little or no braking force may be applied to the wheels on the left-hand side of the vehicle.

Correspondingly, a yaw moment ($\Delta\tau$) that is positive may indicate that the vehicle should be turned in a counterclockwise (CCW) direction to maintain or move toward desired lane centering. To turn the vehicle in a counterclockwise direction, the fail-safe system may only apply differential braking force to the wheels of the left-hand side of the vehicle, and in such an instance very little or no braking force may be applied to the wheels on the right-hand side of the vehicle.

Accordingly, using an example of a vehicle having four wheels, such as an automobile, the total force calculated from the yaw moment ($\Delta\tau$) may be determined for one front and one rear wheel of the four-wheeled vehicle (i.e. the front and rear wheels of either the right-hand vehicle side (e.g. for CW turning movement) or the left-hand vehicle side (for CCW for turning movement).

Using the final total force determined from the yaw moment ($\Delta\tau$), the fail-safe differential braking controller may then determine a distribution ratio value ($\alpha$) to distribute the total braking force, for example between the front and rear wheels of the vehicle where the distribution ratio value may be determined based on considerations such as loading and lateral acceleration. One example ratio may be the production ratio setup for a vehicle's common-mode braking. Proportioning the total braking force using a distribution ratio may adjust the brake torque output at front and rear wheels in accordance with a peak traction force (e.g. to achieve the maximum longitudinal force that may be available from the traction/braking control systems). Correct proportioning may seek to bring both axles (front and rear wheels) up to a lock-up point (point where the axles and their wheels do not turn) simultaneously.

The fail-safe differential braking controller may then determine if the combined braking and steering forces are within the "friction ellipses" for the wheels of the vehicle (using friction coefficients for the tires, etc.). If necessary, the differential braking controller may modify the distribution ratio of the total force (or, if needed, re-calculate the yaw moment ($\Delta\tau$) and the total force value) to fit the forces applied within parameters for vehicle stability.

With the force distribution determined, the fail-safe differential braking controller may access a differential braking system to have the forces applied the brakes. The fail-safe differential braking controller may, for example, generate a sequence of braking commands for the available wheels of the vehicle on a interval (for example $\Delta t$ seconds, e.g. 3 seconds, a value which may be tuned or changed) to provide time for the operator of the vehicle to get back steering control.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
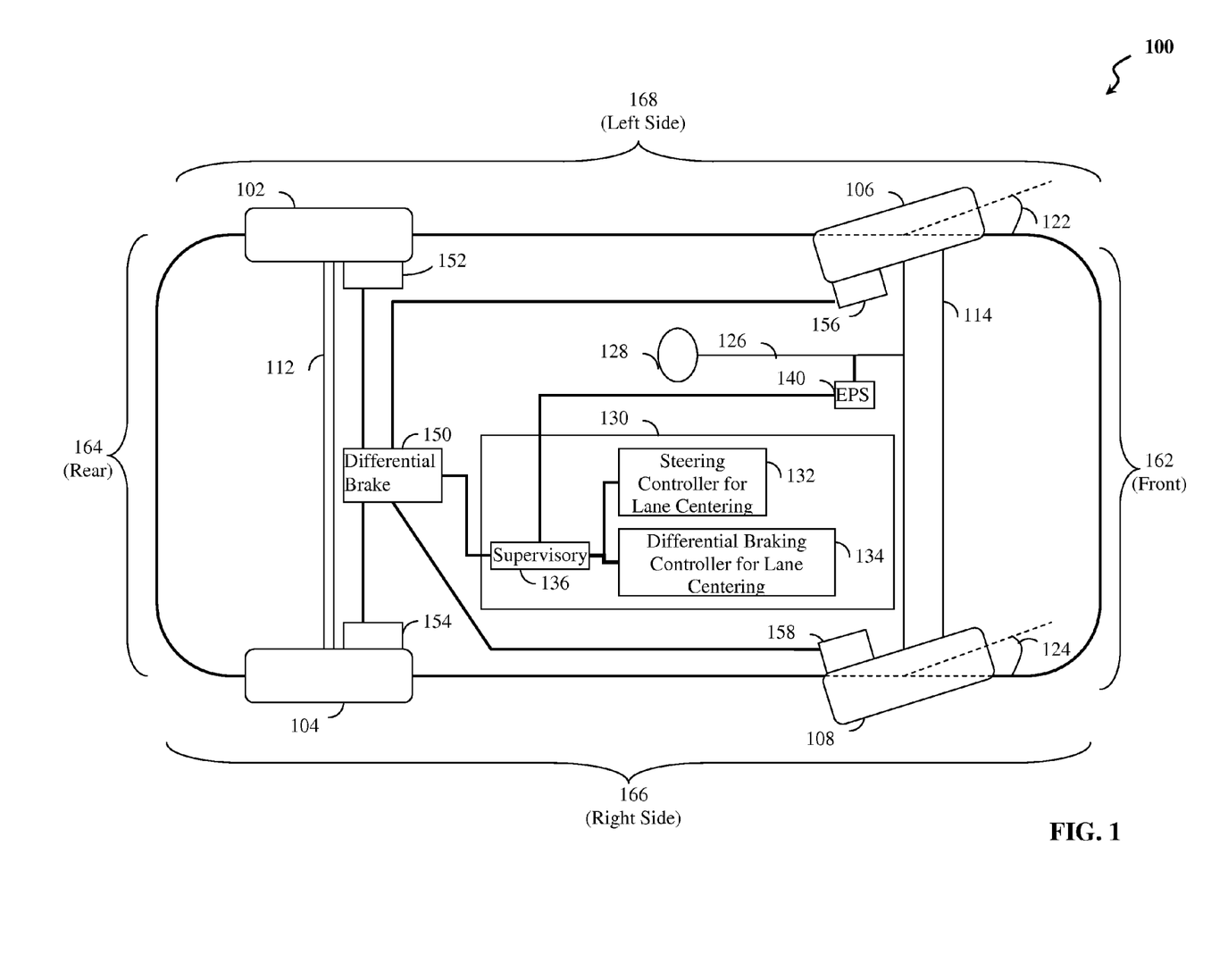
FIG. 1 illustrates in schematic form an exemplary vehicle with a differential braking fail-safe control for a lane centering system, according to an embodiment of the present invention.

Reference is made to FIG. 1 which illustrates elements of a lane centering (LC) system with fail-safe differential braking according to an embodiment of the present invention. FIG. 1 depicts vehicle 100, which may be an automobile or other vehicle, having front side 162, rear side 164, right side 166 and left side 168 (e.g. viewing the vehicle from above). Vehicle 100 is shown with wheels, e.g. left rear wheel 102, right rear wheel 104, left front wheel 106, right front wheel 108. In other examples, vehicles having fewer wheels, e.g. 3, or more wheels, e.g. 6, 8, 16, may also be used according to an embodiment of the invention). In the example of FIG. 1, rear wheels 102, 104 may be coupled to and turn according to axle system 112. Front wheels 106, 108 may be connected to and turn according to axle system 114. Front wheels 106, 108 may also turn or be capable of being angled (as shown by steering angles 122, 124), for example, by turning of steering column 126 which is coupled to axle system 114. An operator may turn front wheels 106, 108 by moving steering wheel 128, coupled to steering column 126. Steering column 126 movements may be translated to angular movements (122, 124) of front wheels 106, 108. (The turning of the steering column may turn wheels 106, 108 to an equal angular degree, such that steering angles 122, 124 are equal).

Vehicle 100 may also include control systems for autonomous or semi-autonomous driving functions. The control system may include lane centering (LC) system 130. LC system 130 may include steering controller for lane centering (LC steering controller) 132. As a fail-safe backup, an embodiment of the present invention may include differential braking controller for lane centering (LC differential braking controller) 134.

LC steering controller 132 may operate in conjunction with an electronic power steering (EPS) system 140, to perform lane centering functions (maintaining a lane, changing lane, etc.). EPS system 140 may include, for example, an actuator motor that turns steering column 126 according to input commands. Steering controller system 132, for example, may output a stream of commands for setting the steering angle of wheels 106, 108. EPS system 140 may set the wheels to those angles in performing a lane centering function.

A supervisory module 136 may operate in conjunction with LC steering controller 132 to monitor the status of EPS system 140. Upon a failure of EPS system 140, such as a power failure, sensor failure, autonomous/semi-autonomous system failure or other failure (e.g. EPS system communication failure, EPS system power line failure, EPS system control processor failure, EPS system motor failure, mechanical problem in EPS system column or rack, flat tire, EPS steering torque imbalance, etc.), supervisory module 136 may pass control for lane centering system 130 to LC differential braking controller 134.

LC differential braking controller 134 may operate in conjunction with electronic differential braking system 150, which may be configured to electronically apply brakes 152, 154, 156, 158 on wheels 102, 104, 106, 108. For example, electronic differential braking system 150 may apply different braking forces to the different wheels 102, 104, 106, 108, using brakes 152, 154, 156, 158 controlled, for example, by brake actuators.

LC differential braking controller 134 may provide a redundant mechanism for safety when EPS system 140 fails and the driver is not ready or is not able to take control of steering wheel 128. LC differential braking controller 134 may determine a yaw moment value, and then determine a braking force for wheels 102-108 to replicate the yaw moment. LC differential braking controller 134 may then transmit commands to differential braking system 150 to control the braking force applied on brakes 152, 154, 156, 158 of wheels 102, 104, 106, 108, respectively to direct the vehicle's motion to follow a desired path determined by lane centering system 130. Motion may be maintained according to the desired path for a period, such as the next Δt seconds, to allow the operator to gain control of steering in vehicle 100.

Figure 2:
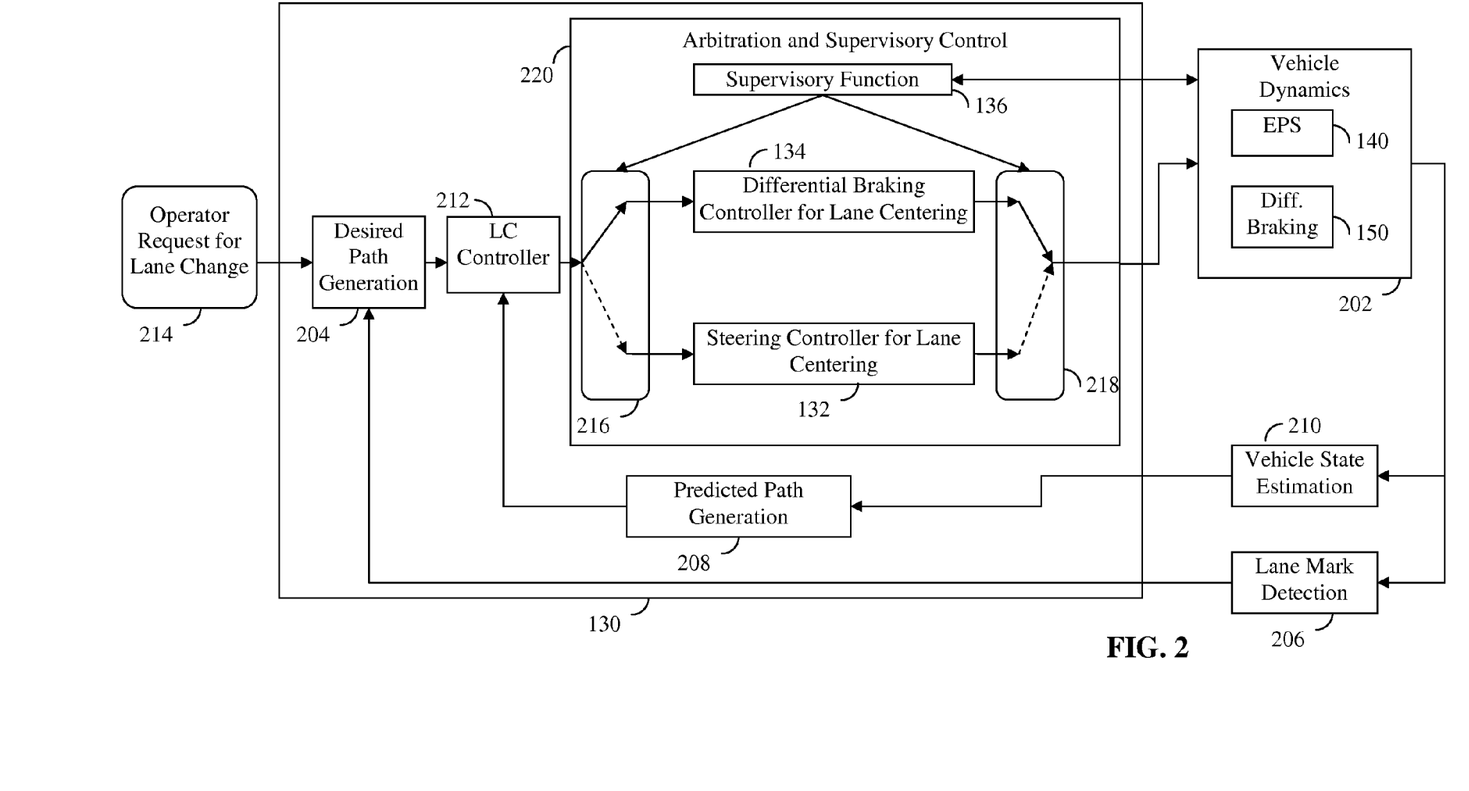
FIG. 2 illustrates in block diagram form elements of a differential braking fail-safe control for a lane centering system, according to an embodiment of the present invention.

Reference is now made to FIG. 2, which illustrates in block diagram form elements of a differential braking fail-safe control for a lane centering system, according to an embodiment of the present invention. FIG. 2 shows arbitration and supervisory control 220 within lane centering system 130 (with LC steering controller 132, LC differential braking controller 134 and supervisory function 136). EPS system 140 and differential braking system 150 from FIG. 1 are also shown plus additional elements. In FIG. 2, EPS system 140 and differential braking system 150 are included in vehicle dynamics systems 202 (e.g. as part of a more general autonomous or semi-autonomous vehicle control system).

In one example, lane centering system 130 may include elements that may determine a desired path and a predicted path for a moving vehicle. Desired path generation unit 204 may generate a smooth desired path for a lane centering function according to vehicle dynamics (e.g. vehicle mass, inertia, dimensions, etc.) and the lane marks detected (where lane mark information may be provided by lane mark detection unit 206). Predicted path generation unit 208 may further generate the vehicle's predicted future path based on current vehicle dynamics (e.g. provided by vehicle state estimation unit 210), such as vehicle speed, yaw rate, and the steering angle (the amount the front wheels of the car are turned from being parallel with the sides of the car).

In lane centering system 130, LC controller 212 may receive inputs of desired path and predicted path to generate yaw moments, which may be received by arbitration and supervisory control 220 and used by either LC steering controller 132 or LC differential braking controller 134, depending on the whether or not supervisory function 136 has detected a failure of EPS system 140.

Systems and methods for determining and generating desired and predicted paths and desired and predicted path data may be found in U.S. patent application Ser. No. 12/143,439 entitled "PATH GENERATION ALGORITHM FOR AUTOMATED LANE CENTERING AND LANE CHANGING CONTROL SYSTEM," and in U.S. patent application Ser. No. 12/399,317 entitled "MODEL BASED PREDICTIVE CONTROL FOR AUTOMATED LANE CENTERING/CHANGING CONTROL SYSTEMS," which are each assigned to assignee of this application and which are each hereby incorporated by reference herein in their entirety.

In FIG. 2, arbitration and supervisory control 220 may receive yaw moments and supervisory function 136 may monitor the status of EPS system 140 (e.g. via vehicle dynamics 202). If EPS system 140 operation is normal, the received yaw moments may be passed to LC steering controller 132. LC steering controller 132 may convert the received yaw moments to steering torque and generate commands for a steering angle ($\delta$) that may be passed to EPS system 140. In the event a failure of EPS system 140 is detected, supervisory function 136 may switch control to LC differential braking controller 134. In such circumstances LC differential braking controller 134, instead of LC steering controller 132 may then receive yaw moments. Using the received yaw moments, LC differential braking controller 134 may, for example, generate differential braking forces and send commands for the braking forces to differential braking system 150 to control the vehicle and, for example maintain the desired path of the lane centering system 130 (e.g. in performing a lane change or maintaining centering in a lane).

In applying differential braking control to maintain a lane centering function, LC differential braking controller 134 (the fail-safe system) may use the yaw moments (e.g. yaw moment values generated from the desired path and predicted path information) to find a sequence of braking commands for the available wheels of the vehicle on a time interval. LC controller 212 may generate the yaw moments for example, using a cost minimization function that minimizes the difference between the desired path and the predicted path of the vehicle.

As shown in FIG. 2 as supervisory function 136 switches control (upon a failure of EPS system 140) from LC steering controller 132 to LC differential braking controller 134, input switch function 216 (e.g. a representation of a logical function of supervisory function 136) may pass yaw moment data (e.g. generated by LC controller 212) to LC differential braking controller 134 (as represented by the solid arrow in FIG. 2). Additionally, output switch function 218 (e.g. a representation of a logical function of supervisory function 136) may send the output of LC differential braking controller 134 to vehicle dynamics 202 for processing by differential braking system 150. When there is no failure of EPS system 140, functioning of arbitration and supervisory control 220 may be seen by the dashed arrows at switch functions 216 and 218, where yaw moment data is passed to LC steering controller 132, which determines steering torque (e.g. commands for steering torque), which may be passed to EPS system 140

LC differential braking controller 134 according to an embodiment of the invention may, for example, generate braking commands for each wheel to minimize orientation and offset errors (e.g. differences in vehicle heading and lateral offset position) between the vehicle's desired path and the vehicle's predicted path based on received yaw moment values. Supervisory function 136, using the logical function of output switch 218 may transfer the commands for execution by differential braking system 150.

Figure 3:
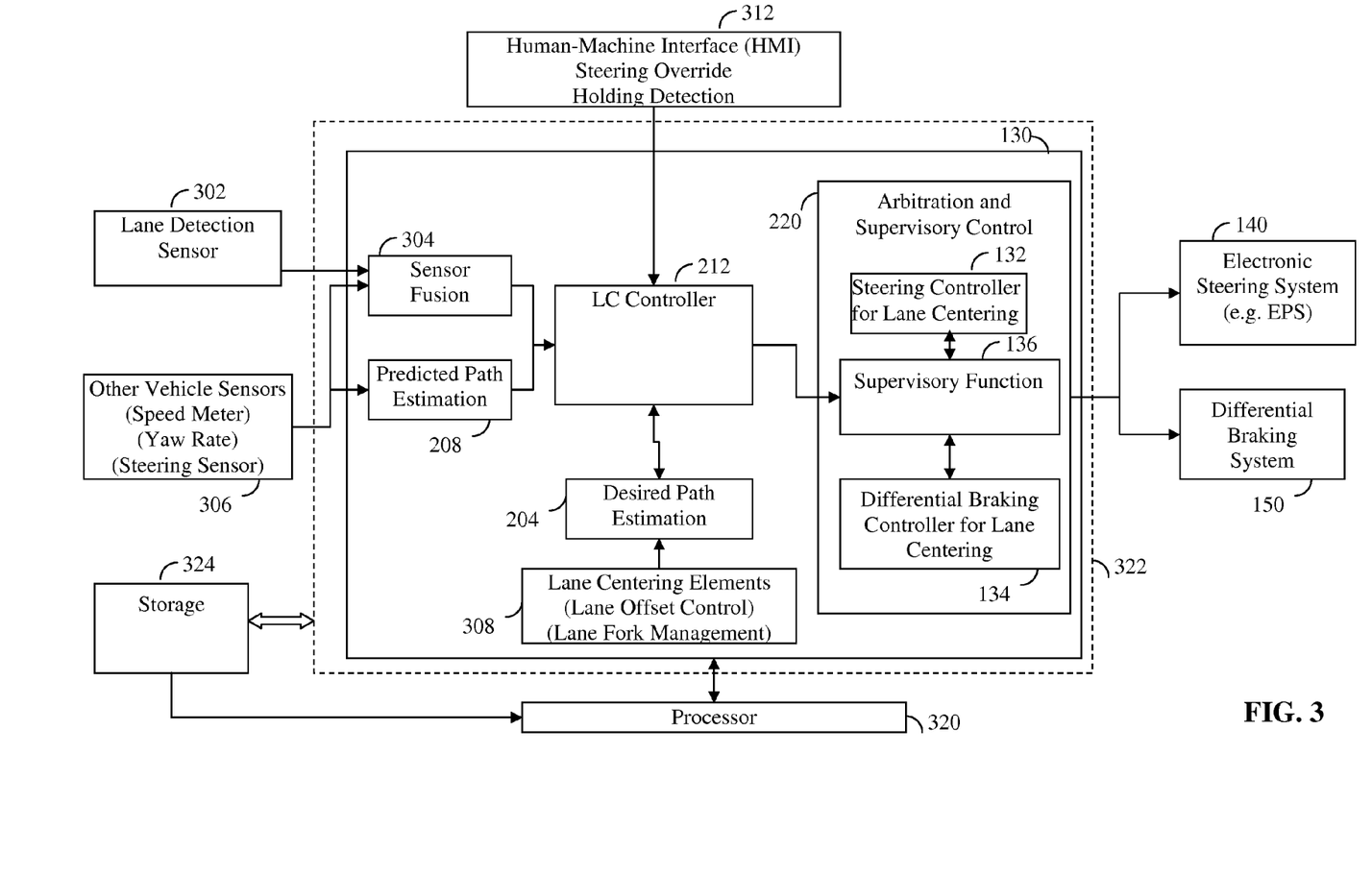
FIG. 3 illustrates in block diagram form a differential braking fail-safe control incorporated into a lane centering system, according to an embodiment of the present invention.

Reference is now made to FIG. 3, which illustrates further an example of a differential braking fail-safe control incorporated into a lane centering system, according to an embodiment of the present invention. FIG. 3 shows elements from FIGS. 1-2, such as lane centering system 130 with LC controller 212 and arbitration and supervisory control 212 (including LC steering controller system 132, LC differential braking controller 134 and supervisory function 136). FIG. 3 also shows EPS system 140, differential braking system 150, desired path estimation unit 204 and predicted path estimation unit 208 from FIG. 2 plus additional elements.

In FIG. 3, lane detection sensor 302 may transmit lane sensing information (e.g. polynomial equations representing lane marks with respect to the vehicle center) to sensor fusion unit 304. U.S. patent application Ser. No. 12/143,439 entitled "PATH GENERATION ALGORITHM FOR AUTOMATED LANE CENTERING AND LANE CHANGING CONTROL SYSTEM," and U.S. patent application Ser. No. 12/399,317 entitled "MODEL BASED PREDICTIVE CONTROL FOR AUTOMATED LANE CENTERING/CHANGING CONTROL SYSTEMS," both assigned to the assignee of this application and both herein incorporated by reference, disclose systems and methods for generating and providing lane sensing information.

Sensor fusion unit 304 also may receive information from other vehicle sensors 306 (e.g. speed meter readings, yaw rate data and steering sensor readings). Sensor fusion unit 304 may generate from the received information a lane path estimate (including, for example, estimations of lane curvature, lane width, offset value to lane center, and heading angle). This information may be forwarded to desired path generation unit 204 (e.g. via LC controller 212).

Desired path generation unit 204 may use the received information along with further lane centering elements 308, such as lane offset control information (which may include a lane offset is the command from the driver—driver may want to be 10 cm off from the lane center) and lane fork management information (e.g. information which indicates if the lane splits into two lane or the lane merges with the adjacent lane) to provide to LC controller 212 a desired path. Desired path may be provided in terms of coordinates and a heading, such as ($x_{Desired}$, $y_{Desired}$, $\theta_{Desired}$), showing the desired position and heading for this instant.

LC controller 212 may also receive predicted path information, in addition to desired path information. Vehicle sensor information 306 may also be received by predicted path generation unit 208, which may provide to LC steering controller 132 a predicted vehicle path (e.g. in coordinates such as ($x_{Predicted}$, $y_{Predicted}$, $\theta_{Predicted}$) showing the predicted position and heading for this instant) and also information for a predicted state of the vehicle, such as predicted vehicle speed.

Using this desired and predicted path information, LC controller 212 may generate yaw moment values to be used by either LC steering controller 132 or LC differential braking controller 134.

In this example, before any failure of the steering system, LC steering controller 132 may use the yaw moment information (based on desired and predicted path) to generate steering commands for lane centering (e.g. a steering angle (δ)), which may be forwarded to EPS system 140, via supervisory function 136. Human-machine interface (HMI) unit 312 may detect whether the driver is holding the steering and forward commands from the vehicle operator such as a steering override command and a steering override end command. The override command for example may halt the output of steering commands for lane centering by LC steering controller 132.

Supervisory function 136 may monitor the status of EPS system 140, and in the event of EPS system 140 failure, supervisory function 136 may switch control within lane centering system 130 to LC differential braking controller 134, which for example, may then, in the event of EPS system 140 failure, receive yaw moment data and send braking commands to differential braking system 150 (via supervisory function 136) to, for example, maintain the desired path of the lane centering function (e.g. in performing a lane change or maintaining centering in a lane). Differential braking controller 134 may use yaw moment data (e.g. generated from desired path and predicted path information) to find a sequence of braking commands for the available wheels of the vehicle on a time interval that minimizes the difference between the desired path and the predicted path of the vehicle. In such an example where the electrical power steering (EPS) system 140 has failed, the steering-based lane centering controller system may not use desired path and predicted path to generate steering commands (such as commands for steering angle (δ)).

In the example of FIGS. 2-3 it is shown that yaw moment data is generated by LC controller 212 and passed either to LC steering controller 134 or LC differential braking controller, depending on the state of EPS system 140. It is noted here that in other examples it may be possible to incorporate the functions of the LC controller 212 into LC differential steering controller. For example, if a fail-safe mechanism for lane center control was incorporated into a lane centering system that did not use yaw moment for lane centering, the fail-safe mechanism may still be used by incorporating the yaw moment generation function of LC controller 212 into the LC differential breaking controller 134. Other configurations for yaw moment generation and differential breaking control functions are also possible.

In operation, LC differential braking controller 134 may determine a braking force for the vehicle wheels (e.g. 102-108, FIG. 1), based on a determined or received yaw moment value, where the braking force determined replicates the yaw moment. As yaw moment values are further determined or received, LC differential braking controller 134 may generate a stream of braking force commands to be applied to the wheels of the vehicle.

In this example it is noted that, when the steering system has failed, EPS system 140 may not be able to accept a steering command for the steering angle (δ) and, in the event of such a failure, other functions may be used for maintaining lane centering control, such as differential braking. In some examples, where EPS system 140 has failed, the steering response in the wheels may be extremely stiff or locked and the steering angle also may be incapable of changing or very difficult to change. Though in such an example, EPS system 140 is not capable of changing the steering angle, a steering sensor (part of vehicle sensors 306) may be provided to read the steering angle. Thus, in such an example, even though the electrical power steering (EPS) system can fail, it may be assumed that the steering angle (δ) is still measurable for purposes of determining values such as yaw moment.

In one example of an embodiment of the present invention the elements of lane centering system 130 (e.g. 132, 134, 136, 204, 208, 212, 220, 304, 308 shown in FIG. 3) may be software elements, elements of executable computer program code, executed by processor 320. In FIG. 3, memory 322 includes programming modules (of executable software) of lane centering system 130. Each of the modules (e.g. 132, 134, 136, 204, 208, 212, 220, 304, 308) when executed by processor 320, may perform processes described herein, for example.

Processor 320 may be a general purpose PC processor, configured for operation in an in-vehicle computer system or processor 320 may be specialized processor designed to execute the functions of lane centering system 130. Processor 320 may be a single processor or processor 320 may incorporate a number of processors and be capable of distributed processing and/or parallel processing.

Memory 322 may include for example processor memory such as random-access memory (RAM) or other memory accessible and useable by processor 320 to execute the programming stored in memory 322. Additionally, the elements of lane centering system 130 (e.g. 132, 134, 136, 204, 208, 212, 220, 304, 308) may be maintained on storage 324 (from which each of the modules 132, 134, 136, 204, 208, 212, 220, 304, 308 of lane centering system 130 may be downloaded and installed (e.g. to memory 322), which may include disk or server storage, portable memory such as compact disk (CD) memory and/or DVD memory and system memory, such as a hard drive or solid state drive (SSD) on which modules 132, 134, 136, 204, 208, 212, 220, 304, 308 may be installed. For example, stored instructions for performance of functions of lane centering system 130 (e.g. 132, 134, 136, 204, 208, 212, 220, 304, 308) and the processes described herein may be downloaded for execution by a computer processor of a vehicle, such as processor 320.

Although lane centering system 130 (e.g. 132, 134, 136, 204, 208, 212, 220, 304, 308) may be software elements, in one example, in another example (not shown), one or more of the elements of lane centering system 130 may be implemented in circuitry as computer hardware elements.

Figure 4:
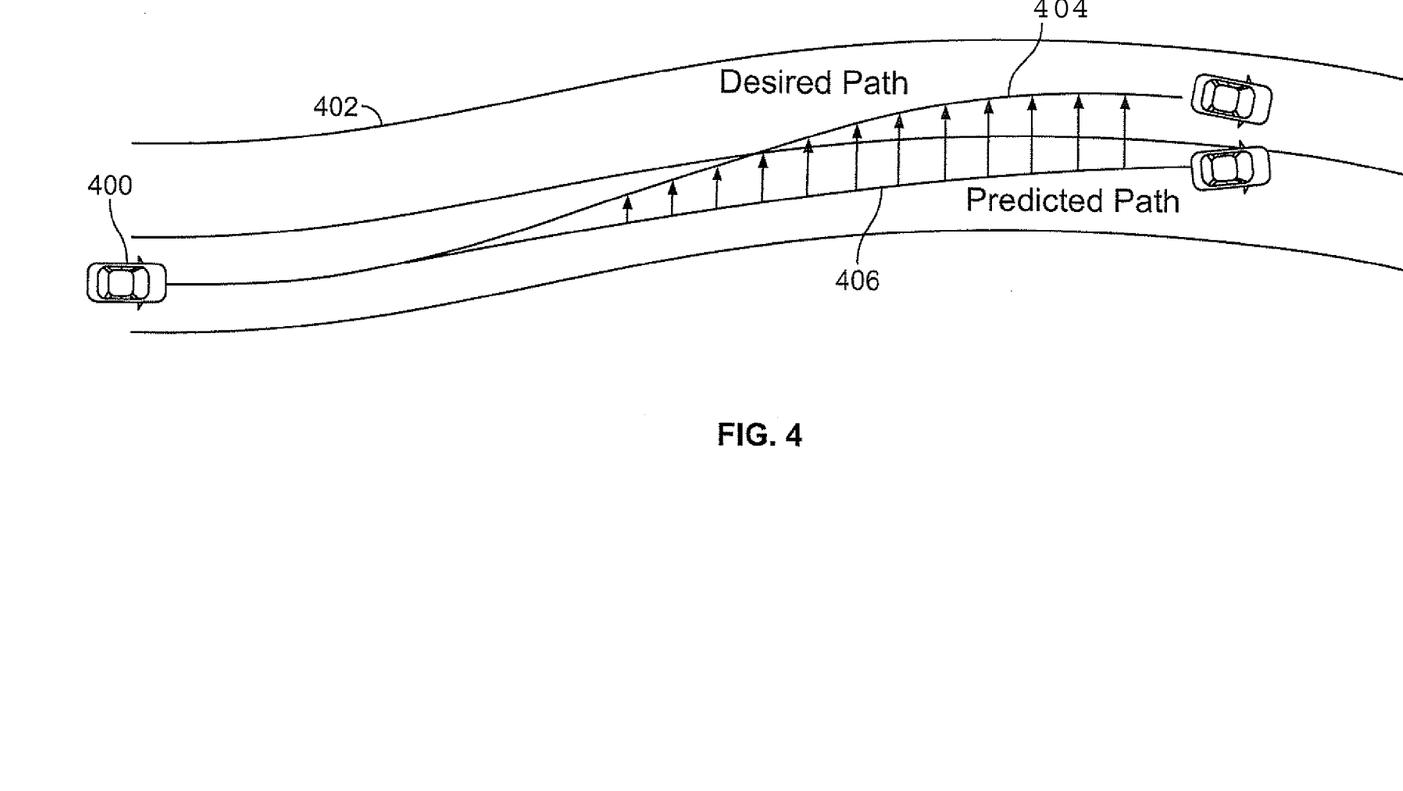
FIG. 4 illustrates a vehicle traveling on a roadway showing a desired path and a predicted path for determining a yaw moment, according to an embodiment of the present invention.

Reference is now made to FIG. 4, which illustrates vehicle 400 traveling on roadway 402 showing a desired path 404 and a predicted path 406 for determining a yaw moment, according to an embodiment of the present invention. For example desired path generation unit 204 (in FIGS. 2-3) may generate, for example, desired path 404 (e.g. in coordinates such as $x_{Desired}$, $y_{Desired}$, $\theta_{Desired}$), and predicted path generation unit 208 (in FIGS. 2-3) may generate, for example, predicted path 406 (e.g. in coordinates such as $x_{Predicted}$, $y_{Predicted}$, $\theta_{Predicted}$). The points ($x_{Desired}$, $y_{Desired}$, $\theta_{Desired}$) and ($x_{Predicted}$, $y_{Predicted}$, $\theta_{Predicted}$) may correspond, as shown by the arrows in FIG. 4 where the coordinates for each of the desired and predicted paths represent points on each of the curves for desired path 404 and predicted path 406, respectively.

Figure 5:
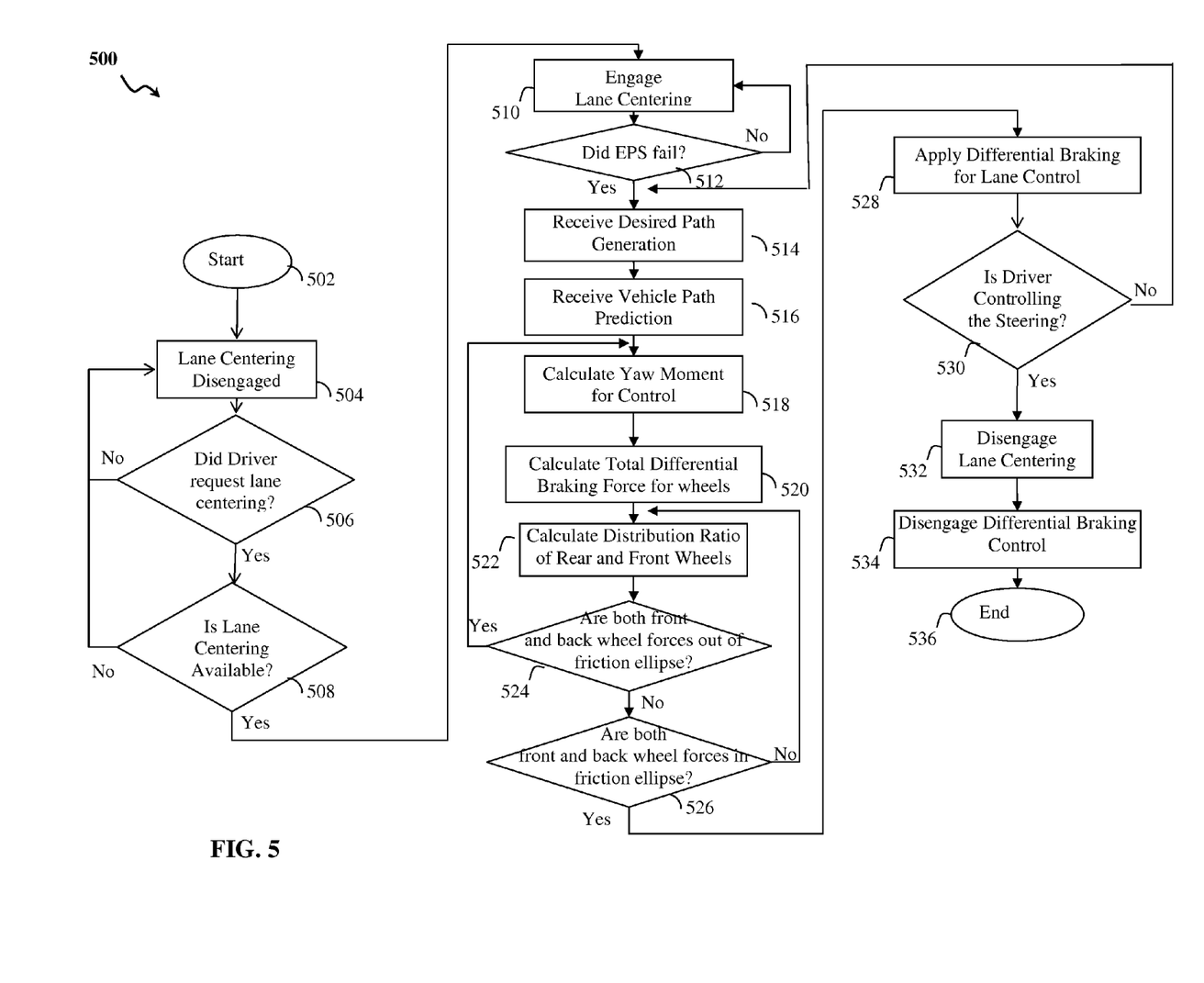
FIG. 5 illustrates a process flow for a differential braking fail-safe control, according to an embodiment of the present invention.

Reference is now made to FIG. 5, which illustrates an exemplary flow for process 500 for fail-safe control using differential braking for a lane control system, according to an embodiment of the present invention. Steps 502-510 of may be, for example executed by a processor (such as processor 320 in FIG. 3) in performing a lane centering control system engaging function, for example the programming of lane centering system 130 including for example, LC controller 212, supervisory function 136 LC steering controller 132 and LC differential braking controller 134.

In step 502, process 500 begins and in step 504 the processor, for example as a default, may disengage lane centering system 130. In step 506, process 500 may determine if the driver has requested (e.g. through human-machine interface 312) a lane change function. If in step 506, driver did not request a lane change function, process 500 returns to step 504. If driver did request a lane change function, process 500 may proceed to step 508 to determine if lane centering system 130 is available for operation. Lane centering system 130 may not be available or on-line because of a power failure, processor failure or other failure.

If in step 508, process 500 determines that lane centering system is not available, process 500 may return to step 504 (e.g. waiting for another driver request for a lane centering function). If in step 508 process 500 determines lane centering system 130 is available, process 500 in step 510 may engage lane centering processes, such as desired path estimation (e.g. from desired path generation unit 204), predicted path estimation (e.g. from predicted path generation unit 208) LC controller 212 and arbitration and supervisory control 220 (including LC steering controller 132). In step 510 LC controller 212 may generate yaw moment values based on inputs of desired path and predicted path (see, e.g. FIGS. 2-3) and LC steering controller 132 may use those yaw moment values to control the steering angle of the car via commands to EPS system 140 and move the car to the determined lane center, such as for example in response to a lane centering request (and center the car in the lane as it moves).

In step 512, process 500 may determine whether or not the electric steering has failed. For example, processor 320, executing supervisory function 136, may monitor the status of EPS system 140, (e.g. with supervisory function monitoring EPS system 140 on a separate processing thread). If in step 512 process 500 determines EPS system 140 has not failed, processor 320, for example executing supervisory function 136, may not intervene, and processor 320 may allow the function of LC steering controller 132 to remain engaged. If in step 512 process 500 does determine that a failure of EPS system 140 has occurred, processor 320, e.g. executing supervisory function 136, may switch processing control of from LC steering controller 132 to LC differential braking controller 134. LC differential braking controller 134 may, for example, send commands to differential braking system 150 to control the vehicle and, for example maintain the desired path of the lane centering function (e.g. in performing a lane change or maintaining centering in a lane).

When supervisory function 136 has switched control to LC differential braking function, LC controller 212 may continue to generate yaw moment values. In such an example, processor 320, e.g. executing LC controller 212, may receive in step 514 data concerning a desired path generation. In step 516, processor 320, e.g. executing LC controller 212, may receive vehicle path prediction information. Processor 320 in step 518, e.g. executing LC controller 212, may calculate a yaw moment value for lane control. The yaw moment values calculated in each instance may be passed to LC differential braking controller 134 (e.g. for determining the differential force to be applied to the wheels). In another example (not shown), the functions of LC controller 212, for calculating yaw moment values may be incorporated into LC differential braking controller 134, and in such an example steps 514, 516 and 518 may be performed by processor 320 executing LC differential braking process 134 alone. Other processing configurations are also possible.

In determining yaw moments in step 518 of process 500, processor 320 may calculate a yaw moment ($\Delta\tau$) value according to a cost function that minimizes the vehicle's desired path and predicted path. One example cost function which may be used is:

$$J = \int_0^{\Delta T} \left\{ [y\ \varphi]_{err} \cdot Q(x) \cdot \begin{bmatrix} y \\ \varphi \end{bmatrix}_{err} + \Delta\tau \cdot R(t) \cdot \Delta\tau \right\} dt$$

where:

$y_{err}$ equals the lateral offset error between desired and predicted paths ($= y_{desired} - y_{predicted}$)

$\varphi_{err}$ equals the vehicle heading angle error between desired and predicted paths ($= \varphi_{desired} - \varphi_{predicted}$)

and $Q(x)$ and $R(t)$ may provide weighting factors, which may be tuned, for example, through vehicle dynamics simulation or vehicle testing. $Q(x)$ may be a function describing how quickly the movement from actual/predicted path to desired path should occur. A small $Q(x)$ value may indicate a slow, or gradual movement to the desired path. A large $Q(x)$ value may indicate a desire for a quick movement to the desired path. $R(t)$ may be a function that provides a reciprocal weighting factor to the yaw moment ($\Delta\tau$) that balances with $Q(x)$. For example, a quick movement to the desired path may require a large yaw moment ($\Delta\tau$) and hence the weighting based on $R(t)$ may be small.

In this equation J (the cost) may be found as a minimum of an integral over the time period from zero (0) to $\Delta T$ (a time period such as 3 seconds, which may be changed or tuned). The equation of the integral may take the lateral offset and heading angle differences (or errors) between the desired and predicted paths and weight them by the $Q(x)$ factors such as (quickness in terms of amount of movement from actual/predicted path to desired path). The cross product of the lateral offset and heading angle differences may then be added to a variable for the yaw moment value, which in this example, is weighted by $R(t)$ factors, (e.g. to balance the yaw moment ($\Delta\tau$) to the speed of the movement desired between actual/predicted path and desired path). Values of $y_{err}$ and $\varphi_{err}$ may be determined in the cost function from the values of ($y_{Desired}$, $\theta_{Desired}$) and ($y_{Predicted}$, $\theta_{Predicted}$) of the desired and predicted paths. The weighing factors $Q(x)$ and $R(t)$ may be pre-determined values e.g. determined through vehicle dynamics simulation or vehicle testing. The value of ($\Delta\tau$) which gives the lowest value of J in the cost function may be the yaw moment value determined in step 518.

In step, 520, process 500 may determine a total braking force value for the wheels using the yaw moment value. As stated, in one example of an embodiment of the present invention, the total braking force value may be calculated for application on the wheels of either the right-hand side of the vehicle ($F_{total\ RHS\ (Right-Hand\ Side)}$) or the left-hand side of vehicle ($F_{total\ LHS\ (Left-Hand\ Side)}$).

The positive or negative value or sign (+/−) of the yaw moment ($\Delta\tau$) may direct that the vehicle executing the failsafe procedure be turned in either a clockwise or counterclockwise direction. If the yaw moment ($\Delta\tau$) is zero, the yaw moment may determine that the vehicle may not be turned at all.

For example, a yaw moment ($\Delta\tau$) that is negative may indicate that the vehicle may need to turn in a clockwise direction to maintain desired lane centering. To turn the vehicle in a clockwise (CW) direction, it may be necessary to apply differential braking force to the right-hand side wheels, where very little or no braking force is applied to the left-hand side wheels.

Correspondingly, a yaw moment ($\Delta\tau$) that is positive may indicate that the vehicle may need to turn in a counterclockwise (CCW) direction to maintain desired lane centering. To turn the vehicle in a counterclockwise direction, differential braking force may need to be applied to the left-hand side wheels, where very little or no braking force is applied to the right-hand side wheels.

If yaw moment ($\Delta\tau$) is zero then no braking force may need to be applied.

Accordingly in step 520, the total force calculated from the yaw moment ($\Delta\tau$) may be determined for the front and rear wheels of either the right-hand side (for CW turning movement) or the left-hand side (for CCW for turning movement). The total force value may then represent a total force to be allocated to a front and a rear wheel of the vehicle, for example where the front and rear wheel is on either the right-hand side or left-hand side of the vehicle (an example of an embodiment of the present invention may also be seen in vehicles with other wheel configurations, such as 3 wheeled vehicles, 8 or 16 wheeled vehicles). In the example of a four-wheeled vehicle, the total force may be determined by formulas such as the following. For clockwise (CW) movement, e.g. if the yaw moment ($\Delta\tau$) is negative, the formula may be:

$$F_{total\,RHS} = \Delta\tau * 2/w \text{ if } \Delta\tau \text{ is CW (brake RHS)}.$$

For counterclockwise (CCW) movement, e.g. if the yaw moment ($\Delta\tau$) is positive, the formula may be:

$$F_{total\,LHS} = \Delta\tau * 2/w \text{ if } \Delta\tau \text{ is CCW (brake LHS)}$$

In the formulas above, the w value may be a constant (or predetermined value) representing the size of the vehicle's wheel base.

In step, 522 of process 500, processor 320 may, based on the determined total force value for the wheels (the front and rear wheels of either the right-hand side (for CW turning) or the left-hand side (for CCW turning)), next determine a distribution ratio $\alpha$ between the front and rear wheels chosen. A distribution ratio may be determined to allocate portions of the total force value between the determined front and rear wheels (for example, based on a load value for the vehicle and a value representing lateral acceleration), wherein the ratio is a value between zero and one. Determination of a value for ratio $\alpha$ in step 522 may depend on factors such as the loading (e.g. vertical load on the tire) and the lateral acceleration that is occurring. The ratio $\alpha$ may be determined by formulas such as the following. For clockwise (CW) movement, e.g. if the yaw moment ($\Delta\tau$) is negative, the formula may be:

$$F_{right\,front\,tire} = \alpha\Delta\tau * 2/w;\ F_{right\,rear\,tire} = (1-\alpha)\Delta\tau * 2/w.$$

For counterclockwise (CCW) movement, e.g. if the yaw moment ($\Delta\tau$) is positive, the formula may be:

$$F_{left\,front\,tire} = \alpha\Delta\tau * 2/w;\ F_{left\,rear\,tire} = (1-\alpha)\Delta\tau * 2/w.$$

In the formulas above the w value may be a constant (or predetermined value) representing the size of the vehicle's wheel base. Also, the ratio $\alpha$, as a distribution ratio, may be some value between 0 and 1 (e.g. $0 < \alpha < 1$).

In step 524, process 500 may next determine if the braking forces that are to be applied to the tires (e.g. combined with the steering force) are within the friction ellipses of the vehicle's tires (In this example, the steering force may be included in the friction ellipse analyses, because the steering angle before the failure may still generate a lateral force that may be included the limit of the friction ellipses). A friction ellipse for a tire, also known as a circuit of forces, traction circle or friction circle, may provide an indication of the maximum horizontal (along the road) force that may be generated with the particular tire. The size of a friction ellipse for a tire or the amount of horizontal (along the road) force the tire may generate may be affected, in general, by aspects such as the design of the tire, the vertical load on the tire, tire wear condition, tire pressure, temperature of the tire road condition, etc. Process 500 may, for example, determine in steps 524 and 526 if the allocated force values for the front and real wheels (when applying the force on either the right or left side) is within the friction ellipses for the tires of the front and rear wheels for the side in question. Where the allocated force values are not within the frictional ellipse (e.g. the force value allocated to the wheel is greater than the force that may be generated with the tire on the wheel), process 500 may make modifications to either the amount of force allocated (e.g. redistribute the found total force) or modify the yaw value (e.g. to generate a new total force).

In step 524 of process 500, processor 320, executing the processes of LC differential braking controller 134, may check to determine if the determined forces for the front and rear wheels of the vehicle side in question (right side or left side) are both out of the friction ellipses of the wheels. If in step 524 the determined forces for the front and rear wheels are both out the friction ellipses for the wheels, processor 320 may return to step 518 to re-calculate the yaw moment (e.g. to generate a yaw moment with a smaller value) and then re-execute steps 520 and 522. For example, step 524 may include determining if the distribution of the total force value for the front wheel is within a friction ellipse for a tire of the front wheel, determining if the distribution of the total force value for the rear wheel is within a friction ellipse for a tire of the rear wheel and returning to step 518 to modify or re-calculate the yaw moment value if neither of the front and rear wheels are within their friction ellipse. Re-calculating the yaw moment value may include determining a smaller value by subtracting a pre-determined amount If in step 524, processor 320 determines at least one of the allocated forces (for the front and rear wheels) is within the friction ellipse for the wheel, then processor 320 may proceed to step 526. In arriving at step 526, either one or both wheels (on either the right or left side of the vehicle) have been allocated a force value that is within (or less than), for example, the maximum force allowable by the friction ellipse of the tires for the wheels in question.

In step 526, processor 320, executing the processes of LC differential braking controller 134, may check this time to determine if the determined forces for the front and rear wheels are both in of the friction ellipses of the wheels For example, If in step 526 both the front and rear wheels are within their friction ellipses, then processor 320 may proceed to step 528 (and run/send commands to the differential braking system). If only one of the wheels is within its respective ellipse, then processor 320 may return to step 522 to re-determine the distribution ratio of the total force being applied the wheels (for example adjusting the ratio $\alpha$ by a pre-determined amount proportional to the percentage of the exceeding force of the wheel that is outside the friction ellipse) and then re-executing step 524 and 526. If in step 526 processor 320 determines both allocated forces (for the front and rear wheels) are within the friction ellipses for the wheels in question, then processor 320 may proceed to step 528.

In step, 528 of process 500, processor 320 may then apply the calculated forces for the front and rear wheels (of either the right-hand or left-hand side of the vehicle) and maintain a course for the vehicle that follows the desired path for the lane change function. As stated, application of the braking force on the front and rear wheels of the vehicle based on the total force value, may cause either a clockwise or counterclockwise change in the heading of the vehicle (e.g. depending on the sign of the yaw moment ($\Delta\tau$)).

In step, 530 of process 500, processor 320 may determine if driver is controlling the steering of the vehicle. The driver's control may be indicated, for example, by human-machine interface unit 312, such as for example if driver provides a command to override the power steering (which may be registered, for example by supervisory function 136 and communicated to LC differential braking controller 134 (and LC steering controller 132). If in step 530, driver is not in control of the steering for the vehicle, process 500 may return to step 514, where steps 514 to 530 may be repeated to continue maintaining the vehicle on the desired path for the lane change function.

If in step 530, the driver is in control of the steering function for the vehicle, processor 320 may proceed to step 532 to disengage lane centering system 130, and in step 534 processor 320 may disengage differential braking control function (e.g. and terminate all functioning of lane centering system 130). Process 500 may terminate in step 536.

Figure 6:
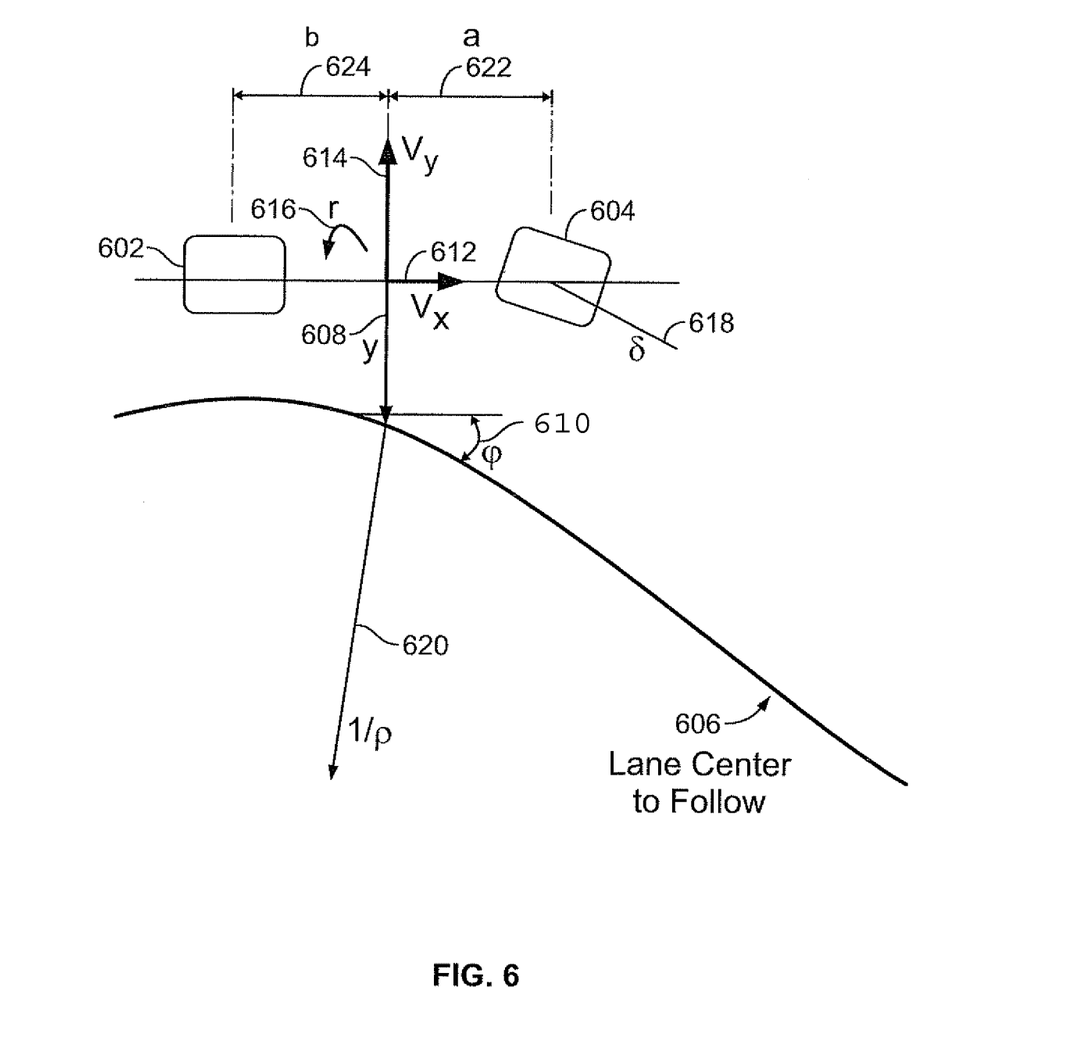
FIG. 6 illustrates lateral dynamics of a vehicle position in relation to a lane center, according to an embodiment of the present invention.

Reference is now made to FIG. 6 which shows lateral dynamics of a vehicle position (of a vehicle having wheels 602, 604) in relation to a lane center according to an embodiment of the present invention. FIG. 6 depicts lane center 606 to follow in a lane centering function. The value y 608 may provide lateral offset to the lane center, for example, in determining position in relation to a desired path of a lane. $\phi$ 610 may provide an orientation angle of the lane. $v_x$ 612 may provide a value for vehicle longitudinal speed. A $v_y$ 614 may provide vehicle lateral speed. An r value 616 may provide a vehicle yaw rate. A $\delta$ value 618 may provide a steering angle. A $\rho$ value 620 (shown in FIG. 6 as $1/\rho$ may provide a value for road curvature. Using such values a the lateral dynamics of the vehicle may be described by a formula such as:

$$\begin{bmatrix} \dot{y} \\ \dot{\phi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{m v_x} & \frac{bC_r - aC_f}{m v_x} - v_x \\ 0 & 0 & \frac{bC_r - aC_f}{I v_x} & \frac{a^2 C_f + b^2 C_r}{I v_x} \end{bmatrix} \cdot \begin{bmatrix} y \\ \phi \\ v_y \\ r \end{bmatrix} +$$

$$\begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho + \begin{bmatrix} 0 \\ 0 \\ 0 \\ 1/I \end{bmatrix} \cdot \Delta\tau$$

In addition to the values identified above y, $\phi$, $v_x$, $v_y$, r, $\delta$, $\rho$, the value $\alpha$ 622 may provide a distance (based on the chassis of the vehicle) from the vehicle's center of gravity to the front axle of the car and b 624 may provide a distance from the center of gravity to the rear axle of the vehicle. The values $C_f$ and $C_r$ values may provide parameters to represent the stiffness of the front wheels and the rear wheels of the vehicle, respectively.

Figure 7A:
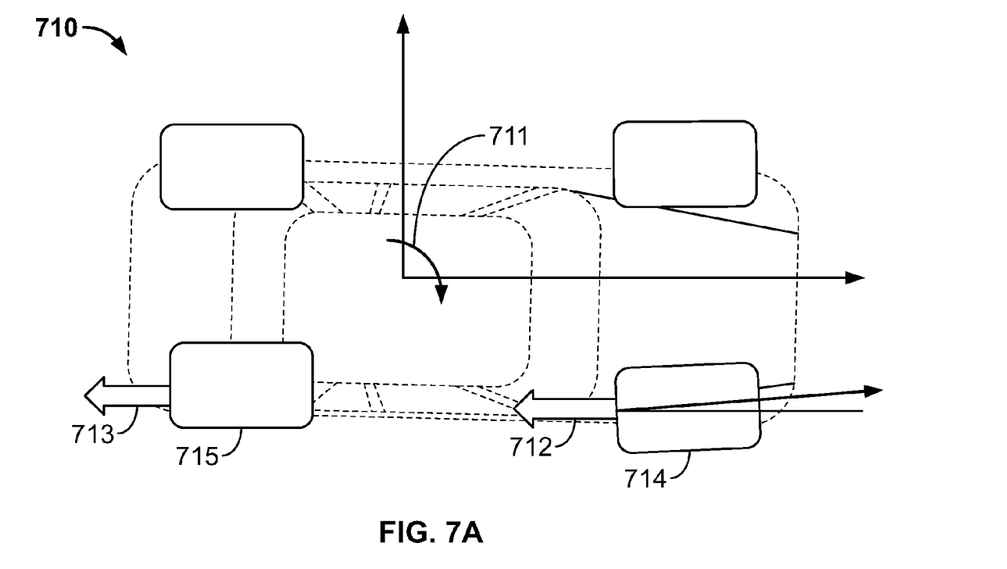
FIGS. 7A-7B illustrate clockwise and counterclockwise differential breaking based on a yaw moment value, according to an embodiment of the present invention.
Figure 7B:
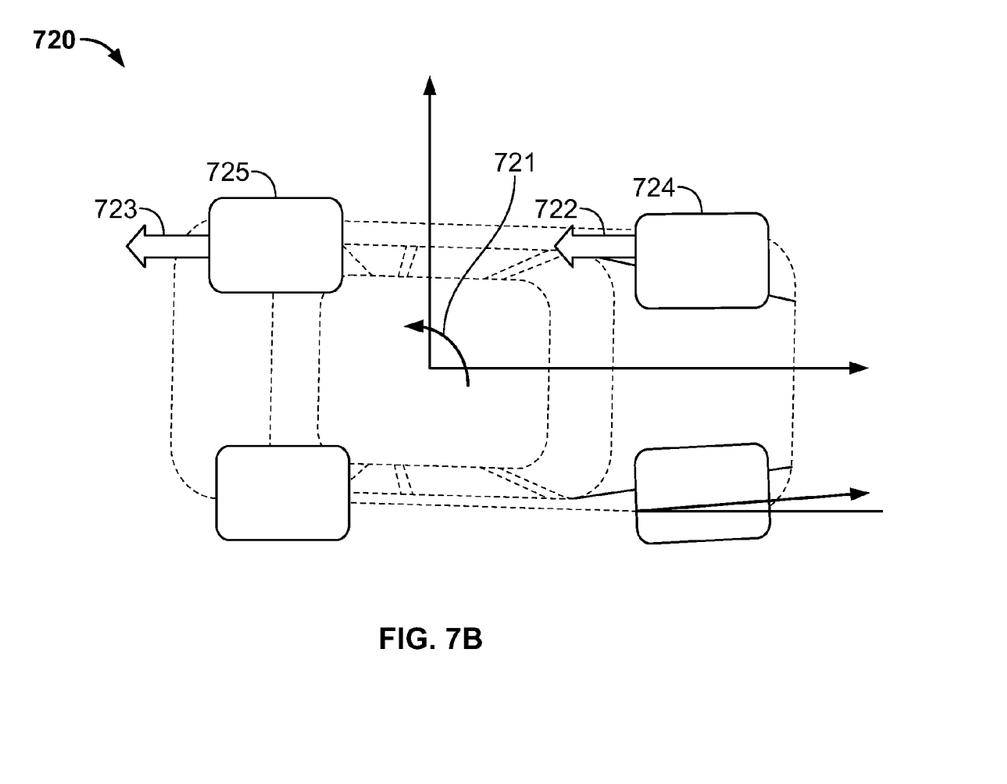

Reference is now made to FIGS. 7A-7B, which illustrate clockwise and counterclockwise differential breaking based on a yaw moment value, according to an embodiment of the present invention. FIG. 7A, shows $\Delta\tau$ yaw moment 711 caused by differential braking forces 712, 713 applied to right front wheel 714 and right rear wheel 715 of vehicle 710. The forces causing yaw moment $\Delta\tau$ 711 may rotate vehicle 710 in a clockwise direction (e.g. as the vehicle is viewed from overhead, looking toward the ground). FIG. 7B, shows $\Delta\tau$ yaw moment 721 caused by differential braking forces 722, 723 applied to right front wheel 724 and right rear wheel 725 of vehicle 720. The forces causing yaw moment $\Delta\tau$ 721 may rotate vehicle 720 in a counterclockwise direction (e.g. as the vehicle is viewed from overhead, looking toward the ground).

Unless specifically stated otherwise, as apparent from the discussions herein, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored as instructions or code in an article such as a memory device, where such instructions upon execution by a processor or computer result in the execution of a method of an embodiment of the invention.

A computer program application stored in non-volatile memory or computer-readable medium (e.g. register memory, processor cache, RAM, ROM, hard drive, flash memory, CD ROM, magnetic media, etc.) may include code or executable instructions that when executed may instruct or cause a controller or processor to perform methods discussed herein such as a method of identifying the level of protection business processes and assets (e.g. IT infrastructure) require based upon their business criticality and value, and identifying the IT infrastructure and design used to implement these business processes. The non-volatile memory and/or computer-readable medium may be a non-transitory computer-readable media including all forms and types of memory and all computer-readable media except for a transitory, propagating signal.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

We claim:

1. A method for fail-safe performance of a lane centering system, the method comprising:
using a computer processor,
monitoring an electrical power steering system of a vehicle for a failure; and
switching operation of the lane centering system to a differential braking controller to output differential braking commands to a differential breaking system, upon determining that a failure of the electrical power steering system has occurred,
wherein the output braking commands direct the differential braking system to apply force a brake for a wheel of vehicle, such by the applied braking force the vehicle follows a desired path determined for a lane centering operation.

2. The method of claim 1, comprising determining a differential braking command by determining a yaw moment.

3. The method of claim 2, wherein the yaw moment is determined according a cost function that minimizes the difference between the desired path and a predicted path of the vehicle.

4. The method of claim 3, wherein the yaw moment is the value for ($\Delta\tau$) found in minimizing lateral offset error ($y_{err}$) and heading angle error ($\phi_{err}$) in the cost function:

$$J = \int_0^{\Delta T} \left\{ [y \; \varphi]_{err} \cdot Q(x) \cdot \begin{bmatrix} y \\ \varphi \end{bmatrix}_{err} + \Delta\tau \cdot R(t) \cdot \Delta\tau \right\} dt$$

wherein,
$y_{err}$ is equal to a difference between a $y_{desired}$ and a $y_{predicted}$ value,
$\phi_{err}$ is equal to a difference between a $\phi_{desired}$ and a $\phi_{predicted}$ value,
and Q(x) and R(t) each comprise at least one weighting factor.

5. The method of claim 4, wherein at least one of Q(x) and R(t) comprises a pre-determined value determined through vehicle dynamics simulation or vehicle testing.

6. The method of claim 2, comprising determining a total force value based on the yaw moment.

7. The method of claim 6, wherein the total force value represents a total force to be allocated to a front and a rear wheel of the vehicle.

8. The method of claim 7, wherein the front and rear wheel is on either the right-hand side or left-hand side of the vehicle.

9. The method of claim 8, wherein the total force value is allocated to the front and rear wheels of either the right-hand side or the left-hand side according to the sign of the yaw moment.

10. The method of claim 7, wherein the total force is determined for the front and rear wheels of the vehicle according to the formula:

$$F_{total} = \Delta\tau * 2/w,$$

wherein $\Delta\tau$ is the yaw moment and w is a value representing the wheelbase size of the vehicle.

11. The method of claim 7, comprising determining a distribution ratio to allocate portions of the total force value between the determined front and rear wheels based on a load value for the vehicle and a value representing lateral acceleration, wherein the ratio is a value between zero and one.

12. The method of claim 11, wherein distribution of the total force value for the front and real wheel is determined according to formulas:

$$F_{front\_wheel} = \alpha\Delta\tau*2/w, \text{ for the front wheel, and}$$

$$F_{rear\_wheel} = (1-\alpha)\Delta\tau*2/w, \text{ for the rear wheel,}$$

wherein $\alpha$ is the distribution ratio, $\Delta\tau$ is the yaw moment and w is a value representing the wheelbase size of the vehicle.

13. The method of claim 12, comprising:
determining if the distribution of the total force value for the front wheel is within a friction ellipse for a tire of the front wheel;
determining if the distribution of the total force value for the rear wheel is within a friction ellipse for a tire of the rear wheel;
modifying the yaw moment value if the distribution of the total force values for both the front and rear wheels are not within the friction ellipses for the tires of the front and rear wheels.

14. The method of claim 13, comprising:
modifying the distribution of the total force values for both the front and rear wheels if the distribution of the total force value for at least one of the front and rear wheels is within the friction ellipses for tire of the wheel.

15. A system for fail-safe performance of a lane centering system, the system for fail-safe performance comprising:
a differential braking controller coupled to a differential braking system; and
a supervisory element coupled to the differential braking controller and a lane centering system, the supervisory element configured to monitor an electrical power steering system of a vehicle for a failure and, upon determining that a failure has occurred, switch an output of the lane centering system to an output of the differential braking controller,
wherein the output of the differential braking controller provides a braking command to the differential braking system for an application of a braking force to a wheel of the vehicle, wherein by the applied braking force the vehicle follows a desired path determined for a lane centering operation.

16. The system of claim 15, comprising:
a desired path estimation unit to provide data for a desired path of the vehicle;
a predicted path estimation unit to provide data for a predicted path of the vehicle; and
a yaw moment determination unit to determine a yaw moment based on the data for the desired path and the data for the predicted path.

17. The system of claim 16 wherein the yaw moment determination unit is located in either differential braking controller or a steering controller of the lane centering system.

18. The system of claim 15, wherein the supervisory function controls an output of the lane centering system to the electrical power steering system and the differential braking system.

19. A non-transitory computer-readable medium having stored thereon instructions, which when executed by a processor cause the processor to perform the method of:
monitoring an electrical power steering system of a vehicle for a failure; and
switching operation of the lane centering system to a differential braking controller, to output differential braking commands to a differential breaking system, upon determining that a failure of the electrical power steering system has occurred, wherein the output braking commands direct the differential braking system to apply force a brake for a wheel of vehicle, such by the applied braking force the vehicle follows a desired path determined for a lane centering operation.

20. A non-transitory computer-readable medium of claim 19, wherein the stored instructions are downloaded for execution by a computer processor of a vehicle.

* * * * *